United States Patent [19]

Kamioka et al.

[11] Patent Number: 5,384,344
[45] Date of Patent: Jan. 24, 1995

[54] FRICTION MATERIAL CONTAINING BT RESIN DUST

[75] Inventors: Nobuo Kamioka, Kasukabe; Hiroshi Tokumura, Hanyu; Toru Yoshino, Gyoda, all of Japan

[73] Assignees: Akebono Brake Industry Co., Ltd., Tokyo; Akebond Research and Development Centre Ltd., Hanyu, both of Japan

[21] Appl. No.: 120,319

[22] Filed: Sep. 13, 1993

Related U.S. Application Data

[63] Continuation of Ser. No. 828,507, Jan. 31, 1992, abandoned.

Foreign Application Priority Data

Feb. 8, 1991 [JP] Japan .................. 3-039108

[51] Int. Cl.⁶ .................................. C08J 5/14
[52] U.S. Cl. .................... 523/149; 523/153; 523/155; 523/156; 523/157; 523/158
[58] Field of Search .............. 523/149, 153, 156, 157, 523/158

[56] References Cited

U.S. PATENT DOCUMENTS

| | | | |
|---|---|---|---|
| 4,310,452 | 1/1982 | Chester | 260/38 |
| 4,866,107 | 9/1989 | Doxsee | 523/153 |
| 4,920,159 | 4/1990 | Das et al. | 523/156 |

FOREIGN PATENT DOCUMENTS

| | | |
|---|---|---|
| 0038689 | 10/1981 | European Pat. Off. |
| 0208326 | 1/1987 | European Pat. Off. |
| 0222394 | 5/1987 | European Pat. Off. |
| 0324908 | 7/1989 | European Pat. Off. |

OTHER PUBLICATIONS

World Patents Index Latest, 86-179926, & JP-A-6-1-113-650, May 31, 1986.
World Patent Index latest, 88-009319, & JP-A-62-270-635, Nov. 25, 1987.

*Primary Examiner*—Tae H. Yoon
*Attorney, Agent, or Firm*—Oblon, Spivak, McClelland, Maier & Neustadt

[57] ABSTRACT

A friction material containing dust having bismaleimidetriazine as a major ingredient. The dust is effective when contained in amount of 1 to 20 wt. % in the friction material. Compared with conventional friction material containing cashew dust, the generation rate of noise is reduced drastically, while the frictional performance is equivalent or higher.

2 Claims, 1 Drawing Sheet

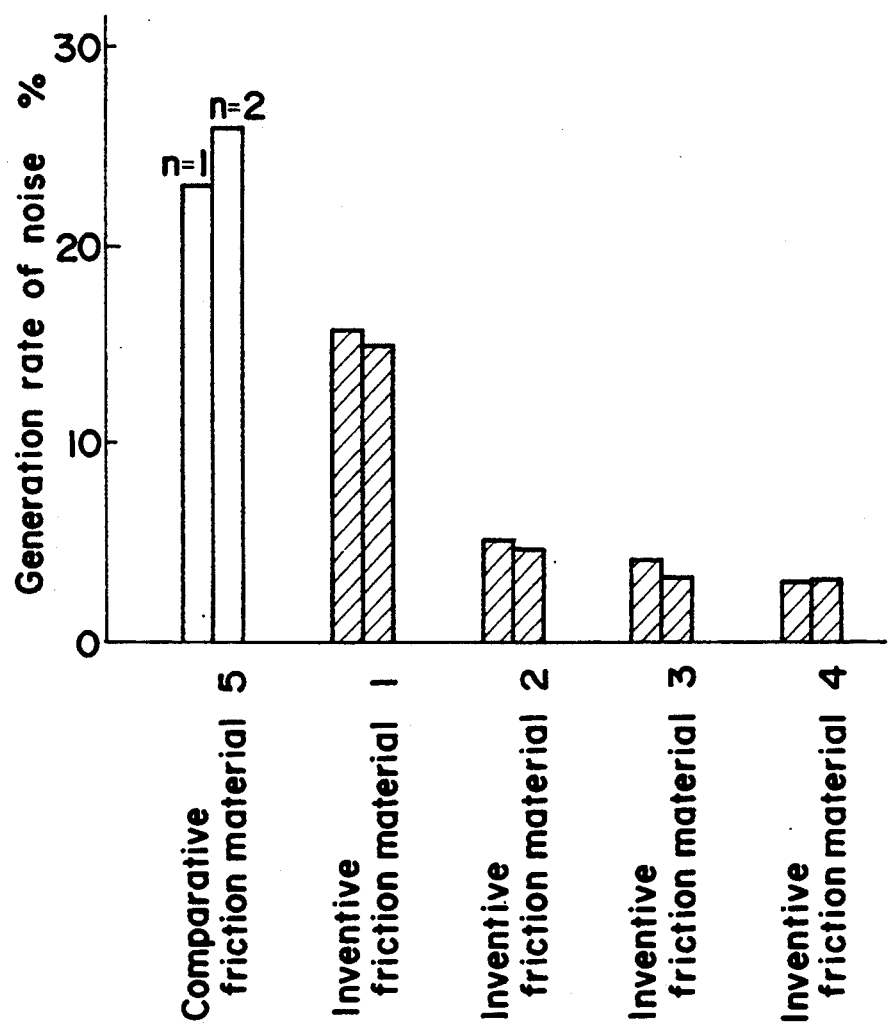

FRICTION MATERIAL CONTAINING BT RESIN DUST

This application is a continuation of application Ser. No. 07/828,507, filed on Jan. 31, 1992, now abandoned.

BACKGROUND OF THE INVENTION

The present invention relates to a friction material for use in brakes and etc. of cars and others, wherein, in particular, the noises generating on braking are prevented.

The conventional mechanical brake rubs solid members one another by contacting them, thus the noises generate inevitably due to the vibrations of them. Today, it is difficult to completely prevent such noises, and we are coping to decrease the noises by such methods that a material absorbing the vibration is formulated in one of opposing brake pads, that an elastomer with good viscoelastic characteristics is allowed to intervene on the way of vibration transfer system, and the like. However, it cannot still be said to be sufficient.

Here, the inventors have investigated the solution thereof and, paying an attention to the dust contained in the friction material of brake for following purposes, the investigations have been made further.

Namely, the main functions of organic dust are ① improved brake feeling, ② increased efficacy, ③ prevention of noises, and others. Types of dust include now rubber dust, cashew dust and modified articles thereof as shown in U.S. Pat. Nos. 4,310,452 and 4,886,107. The dusts are formed of particles of material of regulated size, after having vulcanized or cured the material of the dusts. The dusts are incorporated in an amount of 2–10 wt. % into the material from which disk brake pads are formed which include fiber reinforcing materials, inorganic fillers and thermosetting resin binder.

On the other hand, with respect to the environment surrounding the brake, the loading exerted on the brake pad is in a tendency to become increasingly severe, resulting from that the rigidity tends to decrease structurally from lightening in weight of car body accompanying with large-sized cars and that the brake system is also progressing toward miniaturization and lightening as well.

Hence, the requirement for the heat resistance of brake pad is increasing, but, with said rubber dust, the purpose is attained by no means and, with cashew dust, it has been difficult to effect the stabilized function over a long period of time, though the heat resistance thereof is higher than that of rubber dust. Namely, the noises generating with pad containing cashew dust have a strong tendency to generate more frequently as the braking is repeated. This is because of that, with increasing heat history due to the repetition of braking, the temperature of brake pad increases gradually and ends up to become over the heat decomposition temperature (about 290° C.) of cashew dust at last, thus exceeding the heat-resistant limit of cashew dust.

As a result of further investigations in view of the points aforementioned, a friction material with excellent heat resistance having prevented the generation of noises has been developed according to the invention.

SUMMARY OF THE INVENTION

The invention is characterized by containing dust having bismaleimidetriazine resin as a major ingredient, the content of said dust being only necessary to be 1 to 20 wt. %.

BRIEF DESCRIPTION OF THE DRAWING

FIG. 1 is a column diagram showing the result of brake noise test.

DETAILED DESCRIPTION OF THE INVENTION

The heat resistance and the residual carbon rate after the heat decomposition due to braking were compared between the bismaleimidetriazine (hereinafter referred to as BT resin) and conventional cashew dust as shown in Table 1.

TABLE 1

| Dust | Heat resistance (°C.) | Residual carbon rate (%) |
|---|---|---|
| BT resin | ca. 390 | 70–75 |
| Cashew dust | ca. 290 | 50 |

As shown, since the heat decomposition point (heat resistance) of BT resin is as higher as about 100° C. over cashew dust, the available temperature range is broader, thus providing a characteristic of broader application range as a friction material. Moreover, since the residual amount of carbon after heat decomposition is also higher, that is, since the existing amount of thermally stable carbon is higher, the BT resin has an advantage that the change in the frictional characteristics including noise property decreases.

Furthermore, the content of dust having said BT resin as a major ingredient in the friction material is effective in amount of 1 to 20 wt. %, but, more preferably, 3 to 8 wt. % are better.

As the binders, thermosetting resins such as phenol resin and polyimide resin can be used and they are preferable to be contained in a proportion of 5 to 20 wt. % in overall components of friction material. As the reinforcing materials, one kind or not less than two kinds of metal fibers such as steel and copper, organic fibers such as Aramid and acrylic and inorganic fibers such as glass and carbon can be used in combination. The optimal proportion thereof is 10 to 40 wt. % in overall components of friction material.

Moreover, as the inorganic fillers, those having a grinding effect such as zircon sand, alumina, silica and magnesia, those having a lubricating effect such as graphite and molybdenum disulfide those having a noise-reducing effect such as vermiculite and mica and those having an extending effect such as barium sulfate, calcium carbonate and calcium silicate can be used in combination. They may be contained in a proportion of 40 to 75 wt. % in overall components of friction material.

In following, explanation will be made about the examples of the invention.

EXAMPLE

The inventive friction materials and the comparative friction material comprising formulation compositions shown in Table 2 were produced. The physical properties of these friction materials are shown in Table 3.

TABLE 2

| Formulating Material | Inventive friction material 1 | Inventive friction material 2 | Inventive friction material 3 | Inventive friction material 4 | Comparative friction material 5 |
|---|---|---|---|---|---|
| Binder |  |  |  |  |  |
| Phenol resin | 8 | 8 | 8 | 8 | 8 |
| Dust |  |  |  |  |  |
| Cashew dust | — | — | — | — | 5 |
| Rubber dust |  |  |  |  |  |
| BT resin dust | 2 | 5 | 10 | 15 | — |
| Inorganic filler |  |  |  |  |  |
| Barium sulfate | 15 | 15 | 15 | 15 | 15 |
| Zircon sand | 10 | 10 | 10 | 10 | 10 |
| Graphite | 12 | 12 | 12 | 12 | 12 |
| Vermiculite | 23 | 20 | 15 | 10 | 20 |
| Reinforcing material |  |  |  |  |  |
| Copper fibers | 25 | 25 | 25 | 25 | 25 |
| Aramid fibers | 5 | 5 | 5 | 5 | 5 |

*ALL VALUES ARE EXPRESSED BY WEIGHT

TABLE 3

| Physical property | Inventive friction material 1 | Inventive friction material 2 | Inventive friction material 3 | Inventive friction material 4 | Comparative friction material 5 |
|---|---|---|---|---|---|
| Hardness (HRS) | 100 | 95 | 90 | 80 | 95 |
| Specific gravity (g/cm$^3$) | 3.2 | 3.1 | 3.0 | 2.9 | 3.1 |
| Porosity (%) | 8 | 10 | 11 | 12 | 10 |

The friction materials as above were applied to brake pad. Table 4 shows the results of friction performance test carried out according to JASO 1201 and further FIG. 1 shows the results of noise test.

TABLE 4

| Friction material | Change in friction coefficient | | | | | Amount of wear (mm) | State of friction surface |
|---|---|---|---|---|---|---|---|
|  | Rubbing | Second efficacy (km/h) | | | Fade |  |  |
|  |  | 50 | 100 | 125 |  |  |  |
| Inventive friction material 1 | 0.48 | 0.47 | 0.44 | 0.44 | 0.39 | 0.52 | Normal |
| Inventive friction material 2 | 0.50 | 0.48 | 0.45 | 0.45 | 0.38 | 0.40 | Normal |
| Inventive friction material 3 | 0.53 | 0.48 | 0.45 | 0.44 | 0.34 | 0.48 | Normal |
| Inventive friction material 4 | 0.55 | 0.50 | 0.45 | 0.45 | 0.30 | 0.60 | Normal |
| Comparative friction material 5 | 0.50 | 0.48 | 0.45 | 0.45 | 0.28 | 0.70 | Normal |

From Table 4, it can be seen that the brake pads using the inventive friction materials have equivalent or higher frictional performance over the pad using conventional comparative friction material. Moreover, according to FIG. 1, it is seen that the generation rate of noises of brakes using the inventive friction materials is obviously decreased compared with that of conventional brake.

As described, in accordance with the invention, conspicuous effects are exerted in that it is possible to drastically suppress the generation of noises on braking over the past without decreasing the frictional performance of friction material, and the like.

What is claimed is:

1. A friction material having heat-resistant properties, comprising:
   from 10–40 wt. % of reinforcing fiber, from 40–75 wt. % of inorganic filler, from 1–20 wt. % of BT resin dust which modifies the frictional properties of the friction material, and from 5–20 wt. % of a thermosetting phenolic resin binder which binds the components of the friction material.

2. The friction material of claim 1, which contains from 3 to 8 wt. % of said dust.

* * * * *

UNITED STATES PATENT AND TRADEMARK OFFICE
CERTIFICATE OF CORRECTION

PATENT NO. : 5,384,344
DATED : January 24, 1995
INVENTOR(S) : Nobuo KAMIOKA, et al.

It is certified that error appears in the above-indentified patent and that said Letters Patent is hereby corrected as shown below:

On the title page, Item [73], the second Assignee should read:

--Akebono Research and Development Centre Ltd. --

Signed and Sealed this

Sixth Day of June, 1995

Attest:

BRUCE LEHMAN

Attesting Officer

Commissioner of Patents and Trademarks